United States Patent [19]
Bell

[11] 3,742,009
[45] June 26, 1973

[54] 2-HYDROXYACETAMIDOBENZOPHENONE ESTERS

[76] Inventor: Stanley C. Bell, Hampton House, Penn Valley, Pa.

[22] Filed: June 18, 1967

[21] Appl. No.: 639,346

Related U.S. Application Data

[63] Continuation-in-part of Ser. No. 365,773, May 7, 1964, abandoned, which is a continuation-in-part of Ser. No. 301,873, Aug. 13, 1963, abandoned.

[52] U.S. Cl. 260/456 A, 260/294.8 F, 260/295 AM, 260/296 R
[51] Int. Cl. .......................................... C07c 143/68
[58] Field of Search ................. 260/456, 490, 456 A

[56] References Cited
UNITED STATES PATENTS
3,121,076  2/1964  Keller et al. ..................... 260/239.3

Primary Examiner—Leon Zitver
Assistant Examiner—Leo DeCrescente
Attorney—Vito Victor Bellino

[57] ABSTRACT

2-Arylsulfonoxyacetamidobenzophenones are prepared in three steps from 2-aminobenzophenones by 1) reacting the 2-aminobenzophenone with an acetylglycolyl halide, 2) hydrolyzing the product to remove the acetyl group, and 3) reacting the so-formed 2-hydroxyacetamidobenzophenone with an arylsulfonyl halide. Alternatively 2-arylsulfonoxyacetamidobenzophenones are prepared in one step from 2-aminobenzophenones by reacting the 2-aminobenzophenone with a 2-arylsulfonoxyacetyl halide. The so-obtained 2-arylsulfonoxyacetamidobenzophenones can be converted to 2-hydroxyaminoacetamidobenzophenones, which are valuable intermediates for the preparation of 1,3-dihydro-2H-1,4-benzodiazepin-2-ones having anticonvulsant, sedative and muscle-relaxant activity.

5 Claims, 1 Drawing Figure

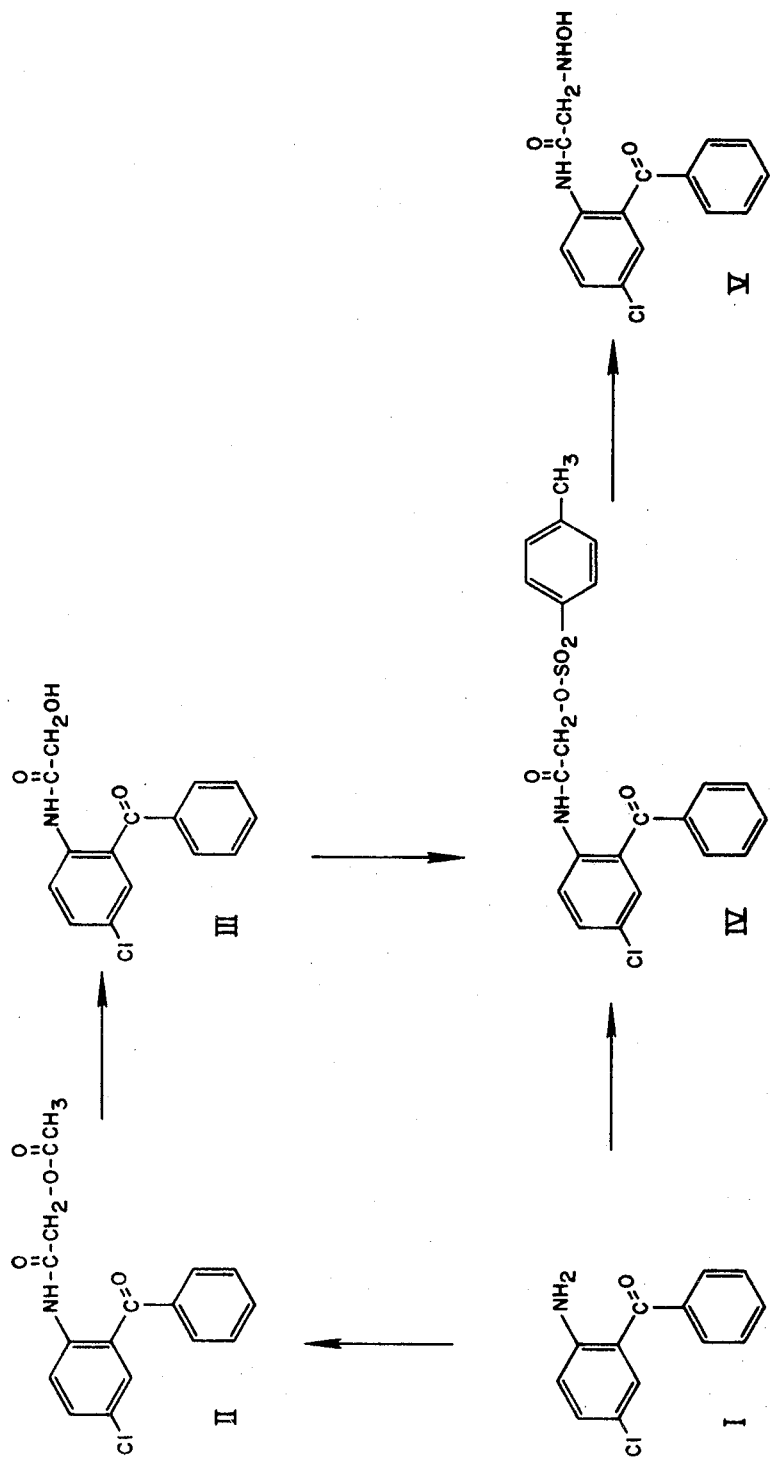

2-HYDROXYACETAMIDOBENZOPHENONE ESTERS

This application is a continuation-in-part of copending application Ser. No. 365,773 filed May 7, 1964 which in turn was a continuation-in-part of application Ser. No. 301,873 filed Aug. 13, 1963, both now abandoned.

The invention sought to be patented in its principal composition aspect is described as residing in the concept of a chemical compound having a molecular structure in which there is attached, to the benzene nucleus, a carboxylic acyl radical at one position and, at a position ortho thereto, an arylsulfonoxyacetamido radical.

The tangible embodiments of the compositions of the invention possess the inherent general physical properties of being relatively high melting, white crystalline solids, are substantially insoluble in water and are soluble in polar solvents, such as lower aliphatic alcohols either cold or on warming. Examination of the compounds produced according to the hereinafter described process reveals upon ultraviolet and infrared spectrographic analysis, spectral data confirming the molecular structure hereinbefore set forth. Thus the -$SO_2$- linkage is eveident. The aforementioned physical characteristics, taken together with the nature of the starting materials and the mode of synthesis, positively confirm the structure of the compositions sought to be patented.

The tangible embodiments of the composition aspect of the invention possess the applied use characteristic of being starting materials for the production of valuable intermediates, i.e., hydroxyaminoacetamidobenzophenones, which are in turn useful for the preparation of known 5-phenyl-1,3-dihydro-2H-1,4-benzodiazepin-2-one-4-oxides mentioned in parent application U. S. Ser. No. 301,873 filed Aug. 13, 1963, and South African Patents No. 60/4930 to 60/4936, and 60/4538. The procedure of using the compound herein claimed to make the hydroxyaminoacetamidobenzophenone intermediates supra is illustrated hereinafter and is said application Ser. No. 301,873. The procedure of using such benzophenone intermediates to make the known 1,4-benzodiazepine-2-one-4-oxides supra is illustrated and disclosed in said application Ser. No. 301,783. The hydroxyaminoacetamidobenzophenones are cyclized to the corresponding 1,4-benzodiazepine-2-one-4-oxides by treatment with either an acid such as acetic, sulfuric, benzenesulfonic or hydrochloric acid, or an alkali metal or alkaline earth metal hydroxide such as sodium, potassium or calcium hydroxide, in an aqueous solvent, such as aqueous ethanol, with heating.

The term "nucleus" is used herein as defined and used in "Hackh's Chemical Dictionary," McGraw-Hill Book Company, Inc., 1944, at page 586 and as specifically applied to "benzene nucleus" at pages 107 to 110. The term "benzene nucleus" as above defined and as used herein and by those skilled in the art means the benzene ring of carbon atoms wherein all valences are satisfied by hydrogen or other monovalent substituents.

The term "radical" is used herein as defined and used in "Hackh's Chemical Dictionary," McGraw-Hill Book Company, Inc. 1944, at page 714 and 715. It is a specific group of named atoms in a certain relationship and contains only one free valence bond which must be satisfied, here by attachment to the benzene nucleus.

The manner and process of making and using the processes and compositions of the invention will now be generally described so as to enable a person skilled in the art of chemistry to use the same, as follows:

The new processes of my invention are illustrated schematically for a specific embodiment in the FIGURE to which the Roman numerals in parentheses in the following description refer.

When a 2-aminobenzophenone (I) is treated with acetylglycolyl halide under the hereinafter described conditions, there is obtained a 2-acetoxyacetamidobenzophenone (II). For optimum yields the benzophenone is dissolved in a solvent such as chloroform and the acetylglycolyl halide is added dropwise. The solution becomes warm during the addition, and preferably the reaction mixture is heated for approximately 15 minutes on a steam bath after the addition is complete. Any acylglycolyl chloride or bromide may be used since the acyl group is subsequently removed by hydrolysis. Similarly, anhydrides of acylated glycolic acid can be used. Other means for acylating the amines can also be employed, for example, the glycolic acid and carbodiimide may be employed. 2-Acetoxyacetamidobenzophenone may also be prepared by refluxing a mixture of 2-iodoacetamidobenzophenone obtained as described in the co-pending application of which this is a continuation-in-part referred to above, with sodium acetate in glacial acetic acid. To avoid an excess use, it will be apparent to those skilled in the art of chemistry that the medium in which the reaction is carried out should be inert to the reagents used. Thus, solvents having hydroxy groups labile to acylating agents are not desirable. Similarly, solvents which may react with amino groups should not be used. It is apparent however that under these circumstances the reaction medium while initially reactive, having been acylated has become inert to further reaction.

The acyl group is removed by hydrolysis by dissolving it in alcohol, or other suitable polar solvent, and adding with stirring aqueous sodium hydroxide. Surprisingly, while reaction apparently could occur at either the ester, or the amide linkage, or both, selective hydrolysis of the ester occurs. When the reaction is complete as evidenced by the clearing of the solution, dilution with water precipitates the product alcohol. Hydrolysis of the ester can also be accomplished by means of any alkaline metal hydroxide and many amines.

To the 2-hydroxyacetamidobenzophenone (III) so obtained is added phenylsulfonyl halide. The reaction mixture is warmed on a steam bath for approximately 30 to 60 minutes. On cooling the solution with ice water, the corresponding 2-phenylsulfonoxyacetamidobenzophenone (IV) is obtained. Any sulfonyl halide may be used, nor is one limited to arylsulfonyl halides such as those specifically disclosed in the specification and examples; for example an alkylsulfonyl halide would also be suitable.

The sulfonoxyacetamidobenzophenone obtained as described above is used for producing the valuable and useful hydroxyaminoacetamidobenzophenones (V), by dissolving it in a solvent such as methyl cellosolve, heating it to approximately 85° C., and adding a solution of hydroxylamine hydrochloride and water containing sodium hydroxide. The temperature is maintained at approximately 85°–90° for about 15 minutes. On cooling and dilution with water the product precipitates. The surprising nature of this reaction is manifest. Hydroxylamine is classically a reagent for characterization of a ketone. Qualitative Organic Analyses tests teach that ketones can be identified by forming the reaction product with hydroxylamine. They contain long lists showing ketones and the physical products of the hydroxylamine derivative. Here, although reaction is with a molecule containing a keto group, nucleophilic replacement of the phenylsulfonoxy group occurs.

Alternatively the 2-phenylsulfonoxyacetamidobenzophenone of our invention (IV) may be prepared by treating the aminobenzophenone (I) in chloroform with phenylsulfonoxyacetyl chloride or bromide, also in chloroform, preferably added dropwise to control the temperature of the reaction. After the addition is complete the reaction mixture is heated on the steam bath for 15 minutes to insure optimum yields. Removal of the solvent and recrystallization gives the desired product.

The 2-aminophenyl carboxylic acyl ketones employed as starting materials for making the compounds of the invention are known, or are readily prepared by procedures known to those skilled in the art of organic chemistry. The acylglycolyl halides or anhydrides employed as starting materials are also known, or are readily prepared by procedures known to those skilled in the art of organic chemistry. It will be apparent to those skilled in the art of organic chemistry that the acyl group, used to protect the hydroxy moiety of the glycolyl halide or anhydride used, and removed in the subsequent hydrolyses may be any acyl group, thus any esterified 2-hydroxyacetamidobenzophenone convertible to a 2-hydroxyacetamidobenzophenone by hydrolysis is the full equivalent thereof. Similarly, the phenylsulfonoxyacetyl halides which are used in the alternative procedure described below, are prepared by procedures known to those skilled in the art of organic chemistry.

It will be apparent from the disclosure herein to those skilled in the art of organic chemistry that for the purposes of this invention, certain of the carbon atoms of the 2-amino aryl ketones employed as starting materials can be substituted with groups which do not interfere with the subsequent reactions involving the 2-amino group. Therefore, in the processes for making the compounds of this invention, except for any limitations expressed in this specification or obvious to those skilled in the art, all 2-amino aryl ketones can be employed as starting materials in the process for making the compounds of this invention. In like manner the 2-acyloxyacetamidoketones and the 2-hydroxyacetamidoketones employed as intermediates may be correspondingly substituted. Furthermore, the 2-carbon of the acetamido group, i.e., that to which the carbonyl group is attached, in the intermediate compounds, can be substituted with hydrogen or with alkyl.

The benzene nucleus bearing the carboxylic acyl radical and acetamido radical can have one or more monovalent substituents other than hydrogen, as for example, but without limitation, lower alkyl, alkoxy, alkylthio, nitro, amino, hydroxy, halogen, preferably chlorine or bromine, trifluoromethyl or alkyl sulfonyl at the 3-, 4-, 5-, or 6-positions. Such substituents do not interfere with the course of the reaction here involved. The carboxylic acyl group of the carboxylic acyl ketone attached at the 1-position can be aroyl, such as benzoyl, 2- or 3-thenoyl; 2- or 3-furoyl; 2-, 3-, or 4-pyridylcarbonyl; or 1- or 2- naphthoyl or it can be alkanoyl. The aryl nucleus of the aryl ketone group particularly when it is phenyl can bear one or more simple substituents inert to the reactions herein described, such as lower alkyl, alkoxy, alkylthio, nitro, amino, hydroxy, halogen, preferably chlorine, bromine, trifluoromethyl, or alkylsulfonyl and such substituted phenyl ketone compounds are the full equivalents of the unsubstituted phenyl nucleus for the purposes of the present invention. From the disclosure herein illustrating the invention as applied to benzophenone starting materials, it will be apparent to organic chemists that heterocyclic nuclei can appear in the starting materials, in lieu of the phenyl group, without affecting the course of the reactions involved at the 2-position. Accordingly such compounds wherein the phenyl group is replaced by 2- or 3- thienyl; 2- or 3-furyl; and 2-, 3-, or 4-pyridyl radicals are the full equivalents of the invention as particularly claimed.

When the starting compounds are substituted as hereinbefore recited, it will be apparent herefrom to those skilled in the art of chemistry that the intermediate compounds and the final products produced by the process of the invention will bear, correspondingly, the same substituents.

The following examples illustrate the best mode contemplated by the inventor of the manner of making and using the invention.

PREPARATION 1

To a solution of 40 g. of 2-amino-5-chlorobenzophenone in 150 ml. of chloroform, add dropwise a solution of 26 g. of acetylglycolyl chloride in 60 ml. of chloroform. The solution becomes warm during the addition, and when the addition is completed, heat the reaction mixture on a steam bath for 15 minutes. Remove the solvent under the reduced pressure and recrystallize the residue in methanol to obtain 50 g. (87 percent yield) of 2-acetoxyacetamido-5-chlorobenzophenone, m.p. 121°–123° C.

$C_7H_{14}ClNO_4$ Calculated: C, 61.5%; H, 4.25%; N, 4.22%; Cl, 10.7%

Found: C, 61.48%; H, 4.30%; N, 4.07%; Cl, 10.9%

Following the above procedure 2-acetoxyacetamidobenzophenone is prepared from 2-aminobenzophenone and acetylglycolyl chloride.

Following the above procedure 2-acetoxyacetamido 2', 5-dichlorobenzophenone is prepared from 2-amino-2', 5-dichlorobenzophenone and acetylglycolyl chloride.

PREPARATION 2

Reflux a mixture of 100 g. of 2-iodoacetamido-5-chlorobenzophenone, 75 g. of sodium acetate and 600 ml. of glacial acetic acid for 2 hours. Dilute the reaction mixture and recrystallize from alcohol to obtain 2-acetoxyacetamido-5-chlorobenzophenone, m.p. 121°–123° C.

PREPARATION 3

To a suspension of 66.6 g. of 2-acetoxy-5-chloroacetamidobenzophenone in 550 ml. of ethanol, add with stirring a solution of 8 g. of sodium hydroxide and 60 ml. of water. Continue stirring until the solution becomes clear. Add 750 ml. of water to precipitate the product. Recrystallize from ethanol to obtain 55 g.

(94% yield) of 2-hydroxyacetamido-5-chlorobenzophenone, m.p. 150°–152° C.

$C_{15}H_{12}ClNO_3$ Calculated: C, 62.18%; H, 4.18%; N, 4.84%; Cl, 12.24%

Found: C, 62.29%; H, 4.15%; H, 4.72%; Cl, 12.30%

Following the above procedure 2-hydroxyacetamidobenzophenone is prepared by hydrolyzing 2-acetoxyacetamidobenzophenone.

Following the above procedure 2-hydroxyacetamido-2',5-dichlorobenzophenone is prepared by hydrolyzing 2-acetoxyacetamido-2',5-dichlorobenzophenone.

EXAMPLE 1

To a solution of 15 g. of 2-hydroxyacetamido-5-chlorobenzophenone and 200 ml. of triethylamine add 28 g. of p-bromophenylsulfonyl chloride. Warm the reaction mixture on a steam bath for abou 30 minutes. Cool and dilute with ice water, and collect the resulting precipitate. Recrystallize from acetonitrile to obtain 17 g. (66% yield), m.p. 150°–152° C. of 2-p-bromophenylsulfonoxyacetamido-5-chlorobenzophenone.

$C_{21}H_{15}BrClNO_5S$ Calculated: C, 49.94%; H, 2.97%; N, 2.75%; Br, 15.71%; Cl, 6.97%; S, 6.30%

Found: C, 49.94%; H, 2.84%; N, 2.93%; Br, 15.6%; Cl, 6.80%; S, 6.30%

Following the procedure described above, p-tosyloxyacetamido-5-chlorobenzophenone (76 percent yield, m.p. 148°–150°C.) is prepared from 2-hydroxyacetamido-5-chlorobenzophenone and p-tosyl chloride.

$C_{22}H_{18}ClNO_5S$ Calculated: C, 59.52%; H, 4.09%; Cl, 7.99%; S, 7.22%

Found: C, 59.57%; H, 3.97%; Cl, 8.0%; S, 7.2%

Following the procedure described above, p-tosyloxyacetamidobenzophenone is prepared from 2-hydroxyacetamidobenzophenone and p-tosyl chloride.

Following the procedure described above, p-tosyloxyacetamido-2',5-dichlorobenzophenone is prepared from 2-hydroxyacetamido-2',5-dichlorobenzophenone and p-tosyl chloride.

Following the procedure described above, methylsulfonoxyacetamido-5-chlorobenzophenone, m.p. 120°–122°C., is prepared from 2-hydroxyacetamido-5-chlorobenzophenone and methylsulfonyl chloride.

$C_{16}H_{14}ClNO_5S$ Calculated: C, 52.24%; H, 3.84%; N, 3.81%; Cl, 9.64%; S, 8.70%

Found: C, 52.30%; H, 3.78%; N, 3.83%; Cl, 9.7%; S, 9.0%

EXAMPLE 2

Following the procedure of Preparation 1, treat a solution of p-tosyloxyacetyl chloride in chloroform with 2-amino-5-chlorobenzophenone in chloroform, to obtain 2-p-tosyloxyacetamido-5-chlorobenzophenone, m.p. 148°–150° C. recrystallized from acetonitrile.

EXAMPLE 3

Following the procedure of Preparation 1, prepare 2-phenylsulfonoxyacetamido-5-chlorobenzophenone from 2-amino-5-chlorobenzophenone and phenylsulfonoxyacetyl chloride, m.p. 130°–132°C.

$C_{21}H_{16}ClNO_5S$ Calculated: C, 58.67%; H, 3.75%; Cl, 8.25%; N, 3.26%; S, 7.46%

Found: C, 58.56%; H, 3.62%; Cl, 8.56%; N, 3.56%; S, 7.5%

Following the procedure of Preparation 1, prepare 2-phenylsulfonoxyacetamidobenzophenone from 2-aminobenzophenone and phenylsulfonoxyacetyl chloride.

Following the procedure of Preparation 1, prepare 2-phenylsulfonoxyacetamido-2',5-dichlorobenzophenone from 2-amino-2',5-dichlorobenzophenone and phenylsulfonoxyacetyl chloride.

The following examples illustrate a method of using the compositions of the inventions.

EXAMPLE 4

To 5.1 g. of p-bromophenylsulfonoxyacetamido-5-chlorobenzophenone in 100 ml. of methyl cellosolve heated to 85° C. add a solution of 10 g. hydroxylamine hydrochloride, 5 g. of sodium hydroxide, and 20 ml. of water. Maintain the temperature at 80°–90°C. for 15 minutes. Cool and dilute with water. Collect the product and recrystallize from benzene to obtain 2-hydroxyaminoacetamido-5-chlorobenzophenone (m.p. 129°–131° C.).

Following the above procedure prepare 2-hydroxyaminoacetamido-5-chlorobenzophenone from 2-p-tosyloxyacetamido-5-chlorobenzophenone and hydroxylamine.

Following the procedure described above prepare 2-hydroxyaminoacetamido-5-chlorobenzophenone from 2-phenylsulfonoxyacetamido-5-chlorobenzophenone and hydroxylamine.

Following the procedure described above prepare 2-hydroxyaminoacetamidobenzophenone from 2-p-tosyloxyacetamidobenzophenone and hydroxylamine.

Following the procedure described above prepare 2-hydroxyaminoacetamido-2',5-dichlorobenzophenone from 2-p-tosyloxyacetamido-2',5-dichlorobenzophenone and hydroxylamine.

The subject matter which the applicant regards as his invention is particularly pointed out and distinctly claimed as follows:

1. 2-phenylsulfonoxyacetamido-5-chlorobenzophenone.

2. 2-p-tosyloxyacetamido-5-chlorobenzophenone.

3. 2-p-bromophenylsulfonoxyacetamido-5-chlorobenzophenone.

4. 2-p-tosyloxyacetamidobenzophenone.

5. 2-p-tosyloxyacetamido-2',5-dichlorobenzophenone.

* * * * *